(12) United States Patent
Ramamurthy et al.

(10) Patent No.: US 9,380,497 B1
(45) Date of Patent: Jun. 28, 2016

(54) CONTROLLED TRANSITION BETWEEN OPERATING MODES FOR CALL INITIATION

(71) Applicant: Sprint Spectrum L.P., Overland Park, KS (US)

(72) Inventors: Suryanarayanan Ramamurthy, Olathe, KS (US); Jay D. Cole, Overland Park, KS (US); Saravana Velusamy, Olathe, KS (US); Rajil Malhotra, Olathe, KS (US); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 118 days.

(21) Appl. No.: 14/177,456

(22) Filed: Feb. 11, 2014

(51) Int. Cl.
*H04L 12/26* (2006.01)
*H04W 4/00* (2009.01)
*H04W 36/00* (2009.01)

(52) U.S. Cl.
CPC .................................. *H04W 36/0022* (2013.01)

(58) Field of Classification Search
CPC . H04W 36/00; H04W 36/0022; H04W 36/14; H04W 36/24; H04W 36/36; H04W 36/385; H04W 48/00; H04W 48/02; H04W 48/04; H04W 48/18; H04W 48/20; H04W 60/04; H04W 76/027; H04W 76/06; H04W 88/06; H04M 3/42348
USPC .......... 370/310–350, 249, 252; 455/403–466
See application file for complete search history.

(56) References Cited

U.S. PATENT DOCUMENTS

| | | | | |
|---|---|---|---|---|
| 7,929,517 B2 | 4/2011 | Lin et al. | | |
| 8,559,417 B2* | 10/2013 | Yun | ...................... | H04L 12/5692 370/352 |
| 8,781,509 B2* | 7/2014 | Fang | .................. | H04W 36/0022 370/355 |
| 8,903,390 B2* | 12/2014 | Yoon | .................... | H04W 36/385 455/435.1 |
| 8,965,391 B1* | 2/2015 | Marupaduga | ......... | H04W 88/06 370/235 |
| 8,995,987 B1* | 3/2015 | Singh | ..................... | H04W 24/00 455/423 |
| 9,094,928 B2* | 7/2015 | Mathias | ................. | H04W 36/30 |
| 2009/0156215 A1* | 6/2009 | Pitkamaki | ............. | H04W 36/14 455/437 |
| 2009/0262704 A1* | 10/2009 | Khetawat | ............... | H04L 63/104 370/331 |
| 2010/0317378 A1* | 12/2010 | Fang | .................. | H04W 36/0022 455/466 |
| 2015/0029973 A1* | 1/2015 | Vesterinen | ............. | H04W 88/06 370/329 |
| 2015/0117320 A1* | 4/2015 | Wang | .................. | H04L 41/0893 370/329 |

* cited by examiner

*Primary Examiner* — Tri H Phan (57) ABSTRACT

Disclosed is an arrangement in which a radio access network detects a trigger such as the RAN being threshold loaded, and the RAN responsively causes each of one or more served UEs to transition from operating in a mode in which the UE would engage in call initiation signaling via the RAN to set up the call extending through the RAN, so the UE would then engage in the call served by the RAN to operating in a mode in which the UE would engage in call initiation signaling via the RAN to instead set up the call extending through another RAN and would transition to be served by the other RAN, so the UE would engage in the call served by the other RAN. As disclosed, one RAN may be an LTE RAN, and the other RAN may be a fallback RAN such as a CDMA or GSM RAN.

20 Claims, 5 Drawing Sheets

CONTROLLED TRANSITION BETWEEN OPERATING MODES FOR CALL INITIATION

BACKGROUND

Unless otherwise indicated herein, the materials described in this section are not prior art to the claims and are not admitted to be prior art by inclusion in this section.

A typical radio access wireless (RAN) network includes a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

In general, a RAN may operate in accordance with a particular radio access technology or "air interface protocol," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures for registration of UEs, initiation of communications, handover between coverage areas, and functions related to air interface communication.

In accordance with the air interface protocol, each coverage area may operate on one or more carrier frequencies or ranges of carrier frequencies In a frequency division duplex (FDD) arrangement, different carrier frequencies or ranges are used for the downlink than the uplink. Whereas, in a time division duplex (TDD) arrangement, the same carrier frequency or range is used for the downlink and uplink and is allocated over time among downlink and uplink communications.

Further, each coverage area may define a number of subsidiary air interface channels for carrying information between the base station and the UEs. These channels may be defined in various ways, such as through frequency division multiplexing, time division multiplexing, and/or code-division multiplexing, for instance. By way of example, each coverage area may define one or more downlink control channels and one or more downlink shared channels having resources that the base station may allocate on an as-needed basis to carry downlink communications to UEs, and each coverage area may provide a downlink reference signal that UEs can detect and measure as a basis to determine downlink channel quality. Further, each coverage area may define one or more uplink control channels and one or more uplink shared channels having resources that the base station may allocate on an as-needed basis to carry uplink communications from UEs, and each UE may provide an uplink reference signal that the base station may measure as a basis to determine a UE's uplink channel quality.

When a UE enters into a base station's coverage area, the UE may register or attach with the base station and may then operate in a connected mode or an idle mode. In the connected mode, the UE may have an assigned radio link layer connection with the base station (which, depending on the air interface protocol, could be one or more dedicated air interface traffic channels or could be a seat allowing the UE to engage in bearer communications on one or more shared traffic channels). In that mode, the UE may thus engage in active bearer communication such as packet-data communication and/or voice calls, transmitting bearer data on uplink traffic channel resources to the base station and receiving bearer data on downlink traffic channel resources from the base station.

After a timeout period of no bearer data communication between the base station and the UE, or for other reasons, the UE may then transition from the connected mode to the idle mode, with the base station releasing the UE's radio link layer connection, so as to conserve resources. In the idle mode, the UE may then simply monitor a downlink control channel to receive overhead information and to check for any page messages for the UE. Further, the UE may then engage in signaling with the base station to transition back to the connected mode if and when the UE receives a page message from the base station indicating an inbound bearer communication or if and when the UE seeks to engage in outbound bearer communication.

OVERVIEW

A fundamental service provided by a RAN is voice telephony service, through which users can place and receive voice calls and thereby engage in voice communication with other parties. In practice, when a UE is served by a RAN and a user directs the UE to place a voice call to another party, the UE may engage in call initiation signaling via the RAN with a network entity or platform to facilitate setup of a "bearer" communication path for the call. With that bearer in place, the UE may then engage in the voice call with the other party via the bearer.

In general, such voice call initiation signaling via a UE's serving RAN may take various forms and may result in setup of a bearers extending through various paths. By way of example, one form of call initiation signaling via a UE's serving RAN may result in setup of a bearer that extends via that serving RAN and with the UE engaging in the voice call via that serving RAN. Whereas, another form of call initiation signaling via the UE's serving RAN may result in setup of a bearer that extends instead via another RAN and with the UE transitioning to be served instead by that other RAN and to engage in the voice call instead via that other RAN.

A good example of these different forms of voice call initiation can be found in a system that includes an LTE RAN and a legacy RAN such as a CDMA RAN or GSM RAN for instance. In such a system, the LTE RAN may provide a UE with packet data connectivity through which UE can engage in Session Initiation Protocol (SIP) signaling with a call server on a packet switched network to facilitate setup of a voice over Internet Protocol (VoIP) call that would extend through the LTE RAN, so that the UE could then engage in the voice call served by the LTE RAN. Further, the LTE RAN and legacy RAN may support another type of voice call setup known as "circuit switched fallback" (CSFB) by which a UE served by the LTE RAN may engage in voice call initiation signaling via the LTE RAN with the legacy RAN, the legacy RAN may set up the requested voice call and assign air interface resources to serve the UE, and the UE may transition from being served by the LTE RAN to being served by the legacy RAN and would then engage in the voice call served by the legacy RAN.

In such a system, a base station in the LTE RAN may have a limited extent of resources for supporting VoIP calls with a sufficient level of call quality. For instance, for each VoIP call that the LTE base station serves, the base station may need to dedicate a connection that supports a minimum guaranteed bit rate deemed sufficient for voice communication, but the LTE base station may have a limited number of such dedicated connections, resulting from a high number of VoIP calls currently being served and/or from use of resources for other purposes. When the LTE RAN is in a mode where it may be unable to serve new VoIP calls with a sufficient level of call quality, it would be desirable for the LTE RAN to cause served UEs that would normally initiate voice calls as VoIP calls to instead initiate any such voice calls using CSFB.

The present disclosure provides for such functionality, generally in the context of a RAN through which a UE may engage in call initiation signaling of various types to either (a) set up a voice call extending through the RAN so that the UE can engage in the call served by that RAN or (b) set up the voice call extending through another RAN to which the UE would transition to be served with the call. In particular, the disclosure provides for a RAN detecting a trigger such as that the RAN has a threshold level of load, such as a threshold number of concurrently served VoIP calls, and the RAN responsively causing a served UE to transition from (i) operating in a mode in which the UE would engage in call initiation signaling via the RAN to set up the call extending through the RAN so that the UE would engage in the call served by the RAN to (ii) operating in a mode in which the UE would engage in call initiation signaling via the RAN to instead set up the call extending through another RAN and would transition to be served by the other RAN, so that the UE would engage in the call served by the other RAN.

By way of the example, the RAN through which this call initiation signaling may pass can be an LTE RAN, and the other RAN can be a legacy RAN such as a CDMA RAN or a GSM RAN. However, the disclosed functionality can extend to apply in the context of other types RANs or other combinations of RAN types as well.

Accordingly, in one respect, disclosed is a method operable at least in part by a first RAN. According the method, the first RAN serves a UE that has two distinct operational modes for initiating a voice call with a remote party: (i) a first mode in which the UE engages in a first type of signaling via the first RAN to set up for the voice call a bearer extending via the first RAN, and the UE then engages in the voice call via the first RAN, and (ii) a second mode in which the UE engages a second type of signaling via the first RAN to set up for the voice call a bearer extending via a second RAN instead of via the first RAN, and the UE transitions from being served by the first RAN to being served by the second RAN and then engages in the voice call via the second RAN. Further, the first RAN detects a first trigger condition, such as that a base station serving the UE has threshold high load, perhaps a threshold high number of currently served VoIP calls. And responsive to detecting that trigger condition, the method then involves causing the UE to transition from operating in the first mode to operating in the second mode, such as by sending a directive to the UE to which the UE is arranged to respond by so transitioning.

In another respect, disclosed is a method operable at least in part by an LTE access network. According to the method, the LTE access network serves a UE and, while serving the UE, detects that the LTE access network is currently serving at least a threshold extent of VoIP over LTE (VoLTE) calls. Responsive to detecting that, the method then involves causing the UE that is being served by the LTE network to transition from operating in a first mode to operating in a second mode. In the first mode, when the UE has a voice call to place, the UE engages in first signaling via the LTE access network to initiate the voice call as a VoLTE call served by the LTE access network and engages in the voice call via the LTE access network. Whereas, in the second mode, when the UE has the voice call to place, the UE engages in second signaling to initiate the voice call as a circuit switched fallback (CSFB) call served by a fallback access network rather than engaging in the first signaling to initiate the voice call as a VoLTE call served by the LTE access network, and the UE transitions from being served by the LTE access network to being served by the fallback access network and engages in the voice call via the fallback access network rather than engaging in the call via the LTE access network.

Still further, in yet another respect, disclosed is an LTE base station that includes an antenna structure for engaging in air interface communication with one or more UEs served by the LTE base station, a backhaul interface for engaging in communication with a gateway system that provides connectivity with a transport network, and a controller configured (e.g., as programmed processor) to carry out functions such as those described above. In particular, the controller is configured to detect that the LTE base station is currently serving at threshold extent of VoLTE calls and, in response to the detecting, to cause at least a given one of the one or more UEs to transition from operating in a first mode to operating in a second mode. And here, in the first mode, when the given UE has a voice call to place, the given UE initiates the voice call as a VoLTE call and engages in the voice call via the LTE base station. Whereas, in the second mode, when the given UE has the voice call to place, the given UE instead initiates the voice call as a CSFB call served by a fallback network, transitions from being served by the LTE base station to being served by the fallback network, and engages in the voice call via the fallback network.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will now be described by way of example in the context of a system that includes an LTE RAN and a legacy CDMA RAN. As noted above, however, it should be understood that principles of this disclosure can extend to other air interface protocols and other network arrangements as well, with variations where appropriate. Further, even within the context of the hybrid LTE-CDMA system described, numerous variations from the specific arrangements and processes described are possible. For instance, various described machines, connections, functions, and other elements may be added, omitted, distributed, re-located, combined, or changed in other ways.

As noted above, FIG. 1 is a simplified block diagram of the example system, including an LTE RAN 12 and a CDMA RAN 14. In the example system, the LTE RAN primarily serves UEs with wireless packet data communication service, including for instance VoLTE service. Whereas the CDMA RAN primarily serves UEs with wireless circuit-switched voice call service (but may also provide packet-data communication service and other types of service). These RANs may be owned or operated by a common wireless service provider, which may enable the provider to serve UEs with high speed packet data service through the LTE RAN and traditional cellular voice call service through the CDMA RAN.

Figure 1:
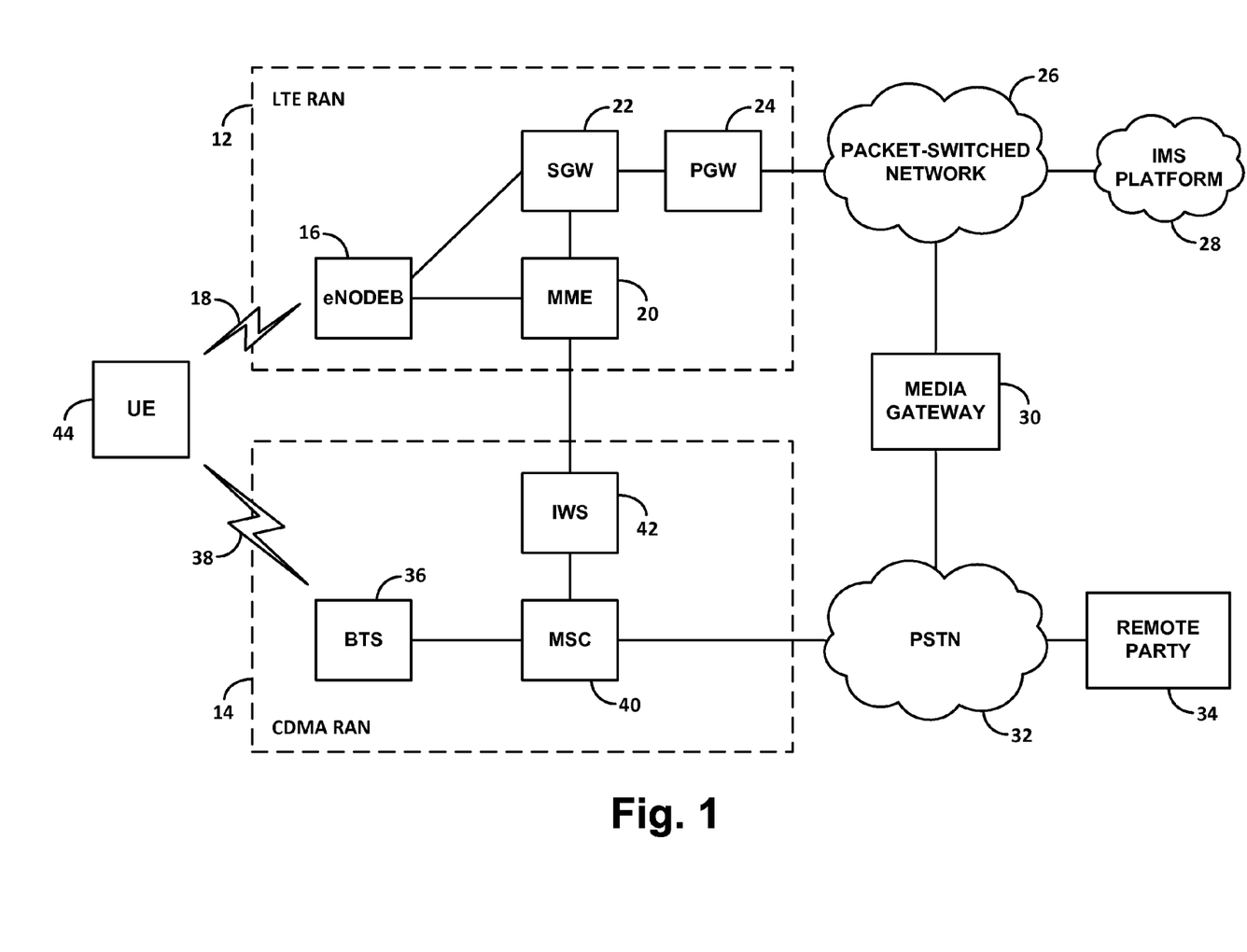
FIG. 1 is a simplified block diagram of a network arrangement in which aspects of the present disclosure can be implemented.

The LTE RAN 12 in the example system is shown including a representative LTE base station 16 known as an eNodeB, which includes an antenna structure and associated equipment for providing an LTE coverage area 18 in which UEs can be served by the eNodeB and thus by the LTE RAN. The eNodeB is then shown having a communication interface with a mobility management entity (MME) 20 that functions as a signaling controller for the LTE RAN. Further, the eNodeB is also shown having a communication interface with a serving gateway (SGW) 22, which is in turn shown having a communication interface with a packet-data network gateway (PGW) 24 that provides connectivity with a packet-switched network 26, and the MME is shown having a communication interface with the SGW. In practice, the illustrated components of the LTE RAN may sit as nodes on a private packet-switched network owned by an operator of the LTE RAN, and thus the various communication interfaces may be virtual interfaces through that network.

Also shown accessible via the packet-switched network 26 in this arrangement is an Internet Multimedia System (IMS) platform 28, which may be arranged to engage in VoIP call initiation signaling with UEs served by the LTE RAN so as to facilitate setup of VoIP calls for those UEs. The IMS platform 28 may include various servers and gateways (not shown), such as a call server, proxies, and the like, and may be arranged to call connections from UEs to remote call parties over the packet-switched network 26 and/or via a media gateway 30 over the PSTN 32. Shown by way of example is then a representative remote call party 34 coupled with the PSTN.

The CDMA RAN 14, on the other hand, is shown including a representative CDMA base station 36 known as a base transceiver station (BTS), which includes an antenna structure and associated equipment for providing a CDMA coverage area 38 in which UEs can be served by the BTS and thus by the CDMA RAN. The BTS is then shown in communication (possibly through a base station controller (BSC) (not shown)) with a mobile switching center (MSC) 40 that provides connectivity with the PSTN 32 and that functions to set up call connections over the PSTN for UEs served by the CDMA RAN.

Further shown in FIG. 1 is then an interworking server (IWS) 42, which serves as a signaling intermediary between the LTE RAN and the CDMA RAN to facilitate functions such as CSFB. The IWS may be provided as an element of either one of the RANs or as an element separate from but connected to each RAN, and in a representative arrangement as shown has a communication interface with the MME of the LTE RAN on one hand and a communication interface with the MSC of the CDMA RAN on the other hand. In an example configuration, the IWS may be integrated with the MSC of the CDMA RAN. But other arrangements are possible as well.

FIG. 1 illustrates a representative UE 44 located within both coverage area 18 of the LTE RAN and coverage area 38 of the CDMA RAN. This representative UE is a hybrid telephony device (e.g., cell phone or other such device), equipped to support both LTE service and CDMA service and is thus capable of being served by both the LTE RAN and the CDMA RAN and engaging in voice calls served the LTE RAN and voice calls served by the CDMA RAN. In practice, the UE may prioritize being served by the LTE RAN. Thus, upon entry into coverage area 18 of the LTE RAN, the UE may have attached with the eNodeB by engaging in attach signaling with the eNodeB and in turn with the MME 20. Further, given the interrelationship between the LTE RAN and the CDMA RAN, when the UE attaches with the eNodeB, the MME may have engaged in signaling with the IWS 42 and in turn with the MSC 40 to also register the UE with the CDMA RAN. In the state shown in FIG. 1, the UE may then be operating in an idle mode being served in coverage area 18 of the LTE RAN until the UE seeks to initiate a communication or until the eNodeB pages the UE to initiate a communication. Although FIG. 1 illustrates only one UE, in practice numerous similar UEs may be operating in the same arrangement.

We may also assume that the representative UE supports engaging in two distinct types of voice calls in this state, (i) VoLTE calls and (ii) CSFB calls, and thus the UE has two distinct operational modes for initiating a voice call with remote party 34.

To facilitate initiating a voice call as a VoLTE call, when the UE attaches with the eNodeB, the LTE RAN may have reserved resources to define for the UE an IMS signaling bearer, which includes a virtual connection through the LTE RAN over which the UE can engage in packet-based session setup signaling with the IMS platform 28. Thus, to initiate a voice call as a VoLTE call, the UE may enter into a connected mode with respect to that IMS signaling bearer and may engage in packet-based session setup signaling such as SIP signaling with the IMS platform 28 to set up a VoIP call session and connection with the remote party.

In particular, the UE may transmit via the LTE RAN to the IMS platform a SIP INVITE message designating the remote party, the UE may receive via the LTE RAN from the IMS platform a SIP 200 OK response message, and the UE may transmit via the LTE RAN to the IMS platform a SIP ACK message to complete setup of a Real-time Transport Protocol (RTP) session for the call, and the IMS platform may extend the call to the remote party. Further, as part of this process, the IMS platform may signal to a policy server (not shown) in communication with the PGW 24, to trigger signaling that causes the LTE RAN to reserve resources to define for the UE a dedicated VoLTE bearer, which includes a virtual connection through the RAN over which the UE can engage in RTP communication at a sufficiently high bit rate to support a desired level of voice call quality. As such, a bearer for the voice call would be set up via the LTE RAN and the UE could then engage in the call with the remote party via the LTE RAN.

To initiate a voice call as a CSFB call, on the other hand, the UE may engage in CSFB call setup signaling via the LTE RAN and ultimately with the MSC of the CDMA RAN. For instance, the UE may transmit over the LTE air interface to its serving eNodeB an extended service request message to request setup of a call to the remote party, and that message or associated signaling may responsively pass to the MME and to the IWS, and ultimately to the MSC. Further, the eNodeB may direct the UE to scan for CDMA coverage and may receive in response from the UE a report indicating that the UE detects coverage area 38, and the eNodeB may pass that information along to the MME for receipt by the MSC as well. In response, the MSC may then cause BTS 36 to allocate a CDMA air interface traffic channel for the UE, MSC may set up the call over the PSTN to the remote party, and the MSC may signal back through the IWS and LTE RAN to the UE to cause the UE to transition from being served by the LTE RAN to being served instead by the CDMA RAN on the assigned traffic channel. Thus, the UE may then engage in the call with the remote party via the CDMA RAN.

The representative UE in the present example may by default be configured to operate in a VoLTE call-initiation mode in which, when the UE has a voice call to place, the UE would initiate the voice as a VoLTE call rather than initiating the call as a CSFB call. In accordance with the present disclosure, however, the LTE RAN (e.g., the eNodeB) may cause the UE to change its configuration so as to transition from operating in that VoLTE call-initiation mode to instead operating in a CSFB call-initiation mode in which, when the UE has a voice call to place, the UE would initiate the call as a CSFB call.

For instance, the eNodeB may transmit to the UE a directive to which the UE may be programmed to respond by switching itself from operating in the VoLTE call-initiation mode to operating instead in the CSFB call-initiation mode. The eNodeB may transmit this directive to the UE when the UE is operating in the idle mode and is thus not currently engaged in voice call communication and is not yet in a process of initiating a call, and the signaling message may have the effect of switching the call-initiation mode of the UE for a voice call that the UE might thereafter seek to initiate. Further, the eNodeB may select the UE to receive such a directive on grounds that the UE is in the idle mode, i.e., based on the fact that the UE is not currently engaged in voice call communication and may transmit the directive to the selected UE.

In practice, for instance, the eNodeB may unicast such a directive to the UE in a page message or the like to the UE. Alternatively, the eNodeB may broadcast such a directive generally in an overhead message in coverage area 18, and each UE that is served by the eNodeB in that coverage area, including UE 44, may receive and respond to the directive by switching itself to operate in the CSFB call-initiation mode rather than in the VoLTE call-initiation mode.

The LTE RAN may cause the UE to transition from operating in the VoLTE call-initiation mode to operating in the CSFB call-initiation mode in response to the LTE RAN detecting a particular trigger condition. Optimally, for instance, the trigger condition may be at least that the eNodeB serving the UE has a threshold high level of load, such that the eNodeB might not be able to serve additional VoLTE calls with a sufficient level of quality. For instance, the trigger condition may include the eNodeB currently serving at least a threshold number of VoLTE calls. As the eNodeB has limited resources, such as limited air interface resources and/or limited backhaul resources, and as the eNodeB may be configured to allocate a guaranteed-bit-rate bearer for each VoLTE call, using this particular trigger may help avoid a scenario where the eNodeB does not have sufficient available resources to serve a newly initiated VoLTE call. As such, the thresholds of load and/or number of VoLTE calls being served can be set dynamically or predefined based on evaluation of an extent of resources to be available for serving a newly initiated VoLTE call, providing some tolerance for changes in resource allocation over time.

Further, other trigger conditions, whether or not related to load of the LTE RAN, could be used as well. For instance, the LTE RAN may switch one or more UEs between the two call-initiation modes on a scheduled basis, such as directing UEs to operate in one mode in one time of day range and to operate instead in the other mode in a separate time of day range. Further, while this disclosure focuses on two distinct modes of call-initiation, the principles can apply as well with respect to more than two distinct modes of call-initiation, with switching between the modes being based on possibly more than one trigger condition.

In a representative implementation of this process, where the LTE RAN had assigned for the UE an IMS signaling bearer or other such signaling bearer for carrying signaling to set up a VoLTE call, the LTE RAN may further function to release that signaling bearer and/or associated resources in response to detecting the trigger condition that results in the LTE RAN causing the UE to switch from the VoLTE call-initiation mode to the CSFB call-initiation mode. The theory here is that, as the UE will be operating in the CSFB call-initiation mode, there may then be no need to maintain for the UE such a signaling bearer for VoLTE call initiation.

Further, once the LTE RAN causes the UE to transition from operating in the VoLTE call-initiation mode to operating in the CSFB call-initiation mode, the LTE RAN may at some point detect another trigger condition and responsively cause the UE to revert from operating in the CSFB call-initiation mode to operating instead in the VoLTE call-initiation mode. For instance, this other trigger condition may be that load at the eNodeB that had been serving the UE is down to a more tolerable level, such as that the eNodeB is not serving the threshold high number of VoLTE calls. To then cause the UE to revert to the VoLTE call-initiation mode, the serving eNodeB may transmit to the UE a directive in the manner discussed above, to which the UE may be programmed to respond by switching itself from operating in the CSFB call-initiation mode to operating in the VoLTE call initiation mode.

Figure 2:
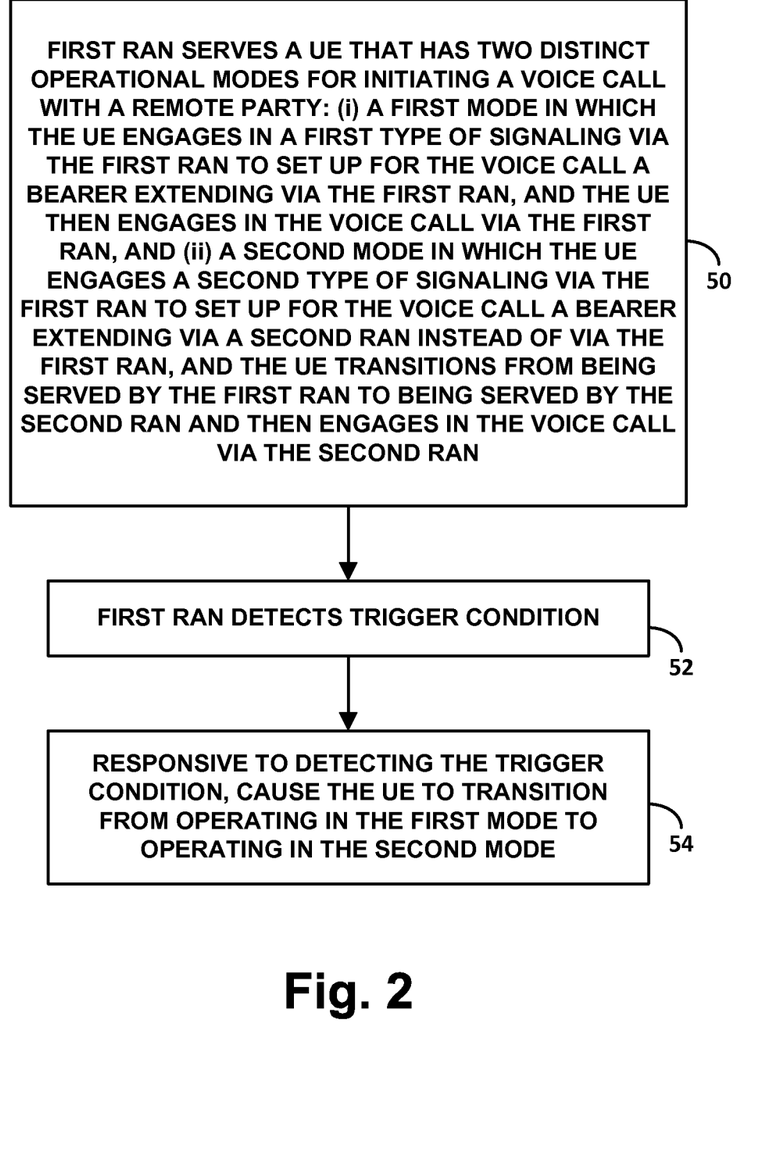
FIG. 2 is a flow chart depicting functions that can be carried out in accordance with the disclosure.

Referring next to FIG. 2, a flow chart is provided to illustrate some of these functions generally, showing by way of example that the functions as discussed above are not necessarily limited to the LTE/CDMA or VoLTE/CSFB scenarios but may more generally apply with respect to any two RANs. As shown in FIG. 2, at block 50, the functions include a first RAN serving a UE that has two distinct operational modes for initiating a voice call with a remote party: (i) a first mode in which the UE engages in a first type of signaling via the first RAN to set up for the voice call a bearer extending via the first RAN, and the UE then engages in the voice call via the first RAN, and (ii) a second mode in which the UE engages a second type of signaling via the first RAN to set up for the voice call a bearer extending via a second RAN instead of via the first RAN, and the UE transitions from being served by the first RAN to being served by the second RAN and then engages in the voice call via the second RAN.

Further, at block 52, the functions include the first RAN detecting a trigger condition. And at block 54, the functions include, responsive to detecting the trigger condition, causing the UE to transition from operating in the first mode to operating in the second mode. In line with the discussion above, the function of block 54 may be carried out by the first RAN as well. However, alternative arrangements may facilitate having one or more other entities carry out that function.

In addition, in line with the discussion above, the first type of signaling in this process could be SIP signaling, the voice call in the first mode could be a VoIP call, the second type of signaling could be CSFB signaling, and the voice call in the second mode could be a CSFB call. Moreover, the first RAN could be an LTE RAN, and the second RAN could be a fallback RAN such as a CDMA RAN or a GSM RAN. Other functions discussed above can also be generalized to apply with respect to the functions of FIG. 2.

Figure 3:
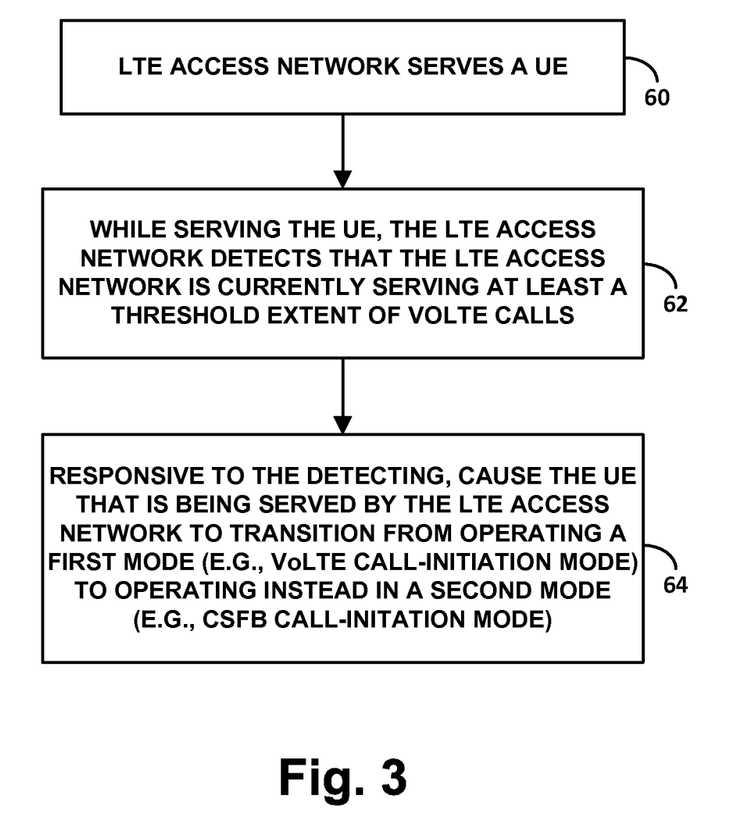
FIG. 3 is another flow chart depicting functions that can be carried out in accordance with the disclosure.

FIG. 3 is next another flow chart, depicting some of the above-discussed functions more specifically. As shown in FIG. 3, at block 60, the functions include an LTE access network (e.g., an LTE eNodeB) serving a UE. Further, at block 62, the functions include, while serving the UE, the LTE access network detecting that the LTE access network is currently serving at least a threshold extent of VoLTE calls (e.g., threshold number of VoLTE calls and/or a threshold extent of resources being reserved for serving of VoLTE calls). And at block 64, the functions include, responsive to the detecting of block 62, causing the UE that is being served by the LTE access network to transition from operating a first mode to operating instead in a second mode. Here again, the LTE access network and/or one or more other entities may carry out the function of block 64.

In line with the discussion above, the first mode may be such that, when the UE has a voice call to place, the UE would engage in first signaling (e.g., SIP signaling) via the LTE access network to initiate the voice call as a VoLTE call served by the LTE access network and would engage in the voice call via the LTE access network. Further, the second mode may be such that, when the UE has the voice call to place, the UE would instead engage in second signaling (e.g., CSFB call setup signaling) to initiate the voice call as a CSFB call served by a fallback access network rather than engaging in the first signaling to initiate the voice call as a VoLTE call served by the LTE access network, and the UE would transition from being served by the LTE access network to being served by the fallback access network and would engage in the voice call via the fallback access network rather than engaging in the voice call via the LTE access network. Further, other functions as discussed above may apply in the context of FIG. 3 as well.

Figure 4:
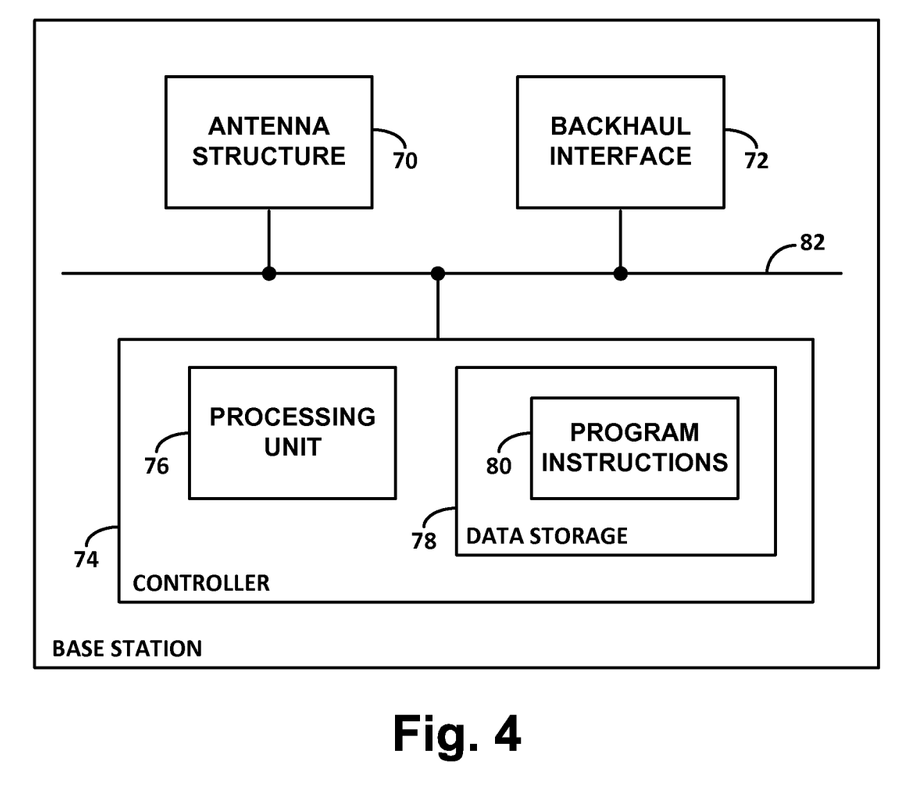
FIG. 4 is a simplified block diagram of an example base station operable in accordance with the disclosure.

FIG. 4 is next a simplified block diagram of an example base station operable in accordance with the present disclosure. This base station may take various forms such as, for instance, a "macro base station" of the type implemented in public spaces typically including a cell tower and tower top antenna structure, or a "small cell", "femtocell", or the like, of the type that typically has a smaller form factor and is designed to provide smaller coverage and perhaps to operate in a smaller area such as in a home, office, of campus. Without limitation, the example base station may be an LTE eNodeB.

As shown in FIG. 4, the example base station includes an antenna structure 70 for engaging in air interface communication with one or more UEs served by the base station. Further, the base station includes a backhaul interface 72 for engaging in communication with a gateway system that provides connectivity with a transport network. In the context of FIG. 1, for instance, the backhaul interface might be an Ethernet network communication interface, and the gateway system may include the SGW and PGW.

In addition, the example base station includes a controller 74 that is configured to manage or carry out various functions such as those discussed above. Such a controller may take the form of a processing unit 76 and non-transitory data storage 78 holding program instructions 80 executable by the processing unit to carry out various functions, and/or the controller may take various other forms and may be integrated with one or more of the other base station components. Further, as shown, the various components of the example base station may be communicatively linked together by a system bus, network, or other connection mechanism 82.

In an example LTE base station, the controller 74 may be configured to detect that the base station is currently serving at threshold extent of VoLTE calls and, in response to that detecting, to cause at least a given one of the one or more UEs to transition from operating in a first mode to operating in a second mode. And in line with the discussion above, the first mode may be such that, when the given UE has a voice call to place, the given UE would initiate the voice call as a VoLTE call and would engage in the voice call via the LTE base station, whereas the second mode may be such that, when the given UE has the voice call to place, the given UE would instead initiate the voice call as a CSFB call served by a fallback network, would transition from being served by the LTE base station to being served by the fallback network, and would engage in the voice call via the fallback network.

Figure 5:
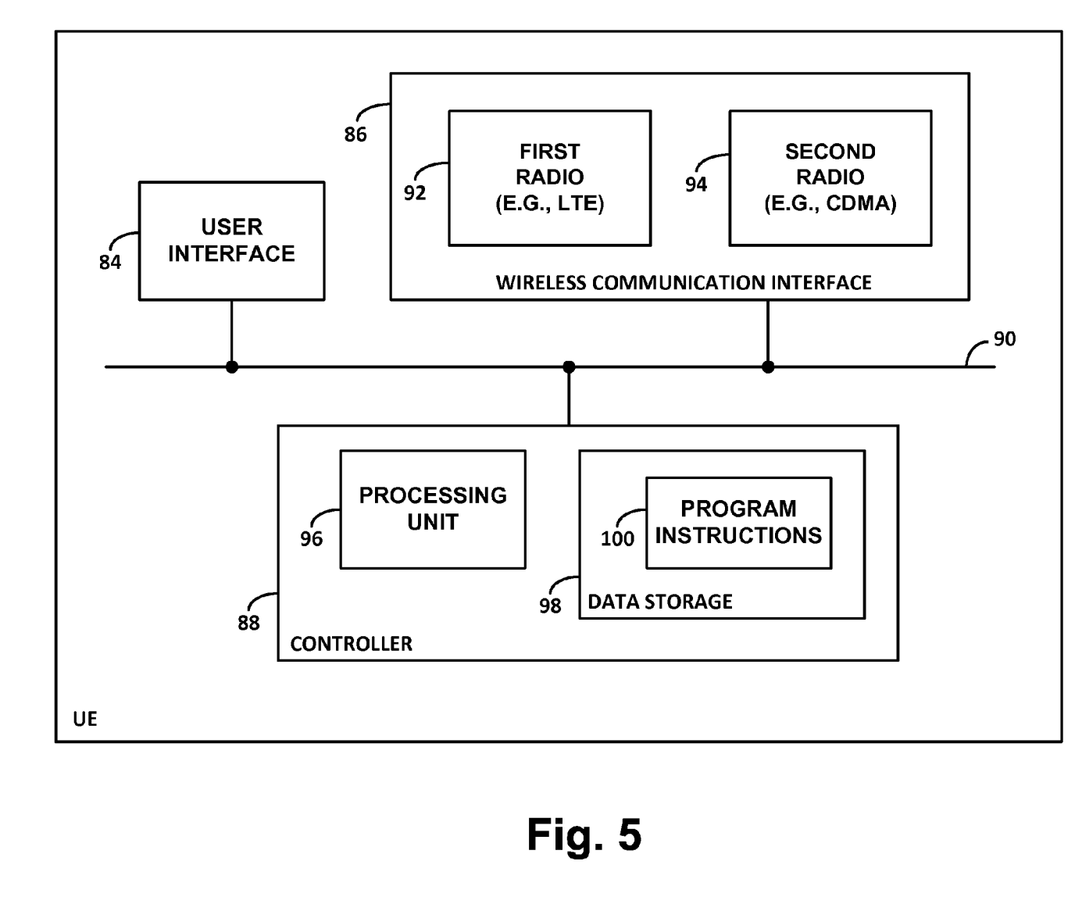
FIG. 5 is a simplified block diagram of an example UE operable in accordance with the disclosure.

Finally, FIG. 5 is a simplified block diagram of an example UE operable in accordance with the present disclosure. Without limitation, the example UE may be a hybrid wireless communication device as described above, supporting both LTE service and CDMA service.

As shown in FIG. 5, the example UE includes a user interface 84, a wireless communication interface 86, and a controller 88, all of which may be coupled together by a system bus, network, or other connection mechanism 90. In practice, the user interface 84 may include input and output components through which a user of the UE can request initiation of voice calls and can engage in voice calls. Further, the wireless communication interface 86 may include one or more radios with associated antennas, such as a first radio 92 configured for the UE to be served by a first RAN such as an LTE RAN, and a second radio 94 configured for the UE to be served by a second RAN such as a CDMA RAN for instance.

Further, the controller 88 may take various forms, including various combinations of hardware, firmware, and/or software (e.g., a processing unit 96, non-transitory data storage 98, and program instructions 100 stored in the data storage and executable by the processing unit), to cause the UE to carry out various functions described herein, and may be integrated with one or more other UE components. In practice, for instance, the controller may be programmed to have the UE operate by default in a first call-initiation mode such as a VoLTE call-initiation mode, to receive a directive transmitted from a serving base station for causing the UE to switch voice call initiation modes, and to responsively transition from operating in the first call-initiation mode to operating instead in a second call-initiation mode such as a CSFB call-initiation mode.

Exemplary embodiments have been described above. Those skilled in the art will understand, however, that changes and modifications may be made to these embodiments without departing from the true scope and spirit of the invention.

We claim:
1. A method comprising:
serving, by a first radio access network (RAN), a user equipment device (UE), wherein the UE has two distinct operational modes for initiating a voice call with a remote party: (i) a first mode in which the UE engages in a first type of signaling via the first RAN to set up for the voice call a bearer extending via the first RAN, and the UE then engages in the voice call via the first RAN, and (ii) a second mode in which the UE engages a second type of signaling via the first RAN to set up for the voice call a bearer extending via a second RAN instead of via the first RAN, and the UE transitions from being served by the first RAN to being served by the second RAN and then engages in the voice call via the second RAN;

detecting by the first RAN a first trigger condition; and responsive to detecting the trigger condition, causing the UE to transition from operating in the first mode to operating in the second mode.

2. The method of claim 1, wherein the first type of signaling is Session Initiation Protocol (SIP) signaling, wherein the voice call in the first mode is a voice over Internet Protocol (VoIP) call, wherein the second type of signaling is Circuit Switched Fallback (CSFB) signaling, and wherein the voice call in the second mode is a CSFB call.

3. The method of claim 2, wherein the first RAN is a Long Term Evolution (LTE) RAN, and wherein the second RAN is a fallback RAN selected from the group consisting of a Code Division Multiple Access (CDMA) RAN and a Global System for Mobile Communications (GSM) RAN.

4. The method of claim 3, wherein the first RAN serving the UE comprises a base station of the first RAN serving the UE over an air interface extending between the UE and the base station, and wherein the first trigger condition comprises at least a threshold high level of load at the base station.

5. The method of claim 4, wherein the threshold high level of load at the base station comprises a threshold number VoIP calls being served by the base station over the air interface.

6. The method of claim 4, wherein causing the UE to transition from operating in the first mode to operating in the second mode comprises transmitting from the base station to the UE over the air interface a directive for the UE to transition from operating in the first mode to operating in the second mode.

7. The method of claim 6, wherein transmitting the directive comprises broadcasting the directive over the air interface for receipt by the UE and by one or more other UEs also served by the base station.

8. The method of claim 1, wherein causing the UE to transition from operating in the first mode to operating in the second mode is done while the UE is not currently engaged in voice call communication.

9. The method of claim 1, wherein the first RAN has assigned for the UE a signaling bearer for carrying the first type of signaling, the method further comprising:

responsive to detecting the first trigger condition, releasing the signaling bearer.

10. The method of claim 1, further comprising, after causing the UE to transition from operating in the first mode to operating in the second mode:

detecting by the first RAN a second trigger condition; and responsive to detecting the second trigger condition, causing the UE to revert from operating in the second mode to operating in the first mode.

11. A method comprising:

serving, by a Long Term Evolution (LTE) access network, a user equipment device (UE);

detecting, by the LTE access network, while serving the UE, that the LTE access network is currently serving at least a threshold extent of voice over LTE (VoLTE) calls; and responsive to the detecting, causing the UE being served by the LTE access network to transition from operating in a first mode to operating in a second mode, wherein, in the first mode, when the UE has a voice call to place, the UE engages in first signaling via the LTE access network to initiate the voice call as a VoLTE call served by the LTE access network and engages in the voice call via the LTE access network, and wherein, in the second mode, when the UE has the voice call to place, the UE engages in second signaling to initiate the voice call as a circuit switched fallback (CSFB) call served by a fallback access network rather than engaging in the first signaling to initiate the voice call as a VoLTE call served by the LTE access network, and the UE transitions from being served by the LTE access network to being served by the fallback access network and engages in the voice call via the fallback access network rather than engaging in the voice call via the LTE access network.

12. The method of claim 11, carried out by a base station of the LTE access network, wherein detecting that the LTE access network is currently serving at least a threshold extent of VoLTE calls comprises detecting that the base station is currently serving at least the threshold extent of VoLTE calls.

13. The method of claim 11, wherein the threshold extent of VoLTE calls is a threshold number of VoLTE calls.

14. The method of claim 11, wherein causing UE being served by the LTE access network to transition from operating in the first mode to operating in the second mode comprises:

selecting the UE based at least on the UE not currently being engaged in voice call communication; and unicasting to the selected UE a command for the selected UE to transition from operating in the first mode to operating in the second mode.

15. The method of claim 11, wherein causing the UE being served by the LTE access network to transition from operating in the first mode to operating in the second mode comprises:

broadcasting a flag that at least the UE is configured to receive and to interpret as a command to transition from operating in the first mode to operating in the second mode.

16. The method of claim 11, wherein the LTE access network has assigned for the UE a signaling bearer for carrying the VoLTE call initiation signaling, the method further comprising:

responsive to the detecting, releasing the signaling bearer.

17. The method of claim 11, wherein the first signaling comprises Session Initiation Protocol (SIP) signaling, and wherein the second signaling comprises CSFB signaling.

18. The method of claim 11, further comprising, after causing the UE to transition from operating in the first mode to operating in the second mode:

detecting, by the LTE access network, that the LTE access network is no longer serving at least the threshold extent of VoLTE calls; and responsive to detecting that the LTE access network is no longer serving at least the threshold extent of VoLTE calls, causing by the LTE access network the UE to revert from operating in the second mode to operating in the first mode.

19. A Long Term Evolution (LTE) base station comprising:

an antenna structure for engaging in air interface communication with one or more user equipment devices (UEs) served by the LTE base station;

a backhaul interface for engaging in communication with a gateway system that provides connectivity with a transport network; and a controller configured to detect that the LTE base station is currently serving at threshold extent of voice over LTE (VoLTE) calls and, in response to the detecting, to cause at least a given one of the one or more UEs to transition from operating in a first mode to operating in a second mode, wherein, in the first mode, when the given UE has a voice call to place, the given UE initiates the voice call as a VoLTE call and engages in the voice call via the LTE base station, and wherein, in the second mode, when the given UE has the voice call to place, the given UE instead initiates the voice call as a circuit switched fallback (CSFB) call served by a fallback network, transitions from being served by the LTE base station to being served by the fallback network, and engages in the voice call via the fallback network.

20. The LTE base station of claim 19, wherein the fallback network is selected from the group consisting of a Code Division Multiple Access (CDMA) network and a Global System for Mobile Communications (GSM) network.

* * * * *